US 9,989,101 B2

(12) United States Patent
Terada

(10) Patent No.: US 9,989,101 B2
(45) Date of Patent: Jun. 5, 2018

(54) METHOD OF MACHINING SEALING SURFACE

(75) Inventor: Kentaro Terada, Iwata (JP)

(73) Assignee: NTN CORPORATION, Osaka (JP)

( * ) Notice: Subject to any disclaimer, the term of this patent is extended or adjusted under 35 U.S.C. 154(b) by 879 days.

(21) Appl. No.: 13/510,964

(22) PCT Filed: Nov. 19, 2010

(86) PCT No.: PCT/JP2010/070691
§ 371 (c)(1),
(2), (4) Date: May 21, 2012

(87) PCT Pub. No.: WO2011/068042
PCT Pub. Date: Jun. 9, 2011

(65) Prior Publication Data
US 2012/0288341 A1    Nov. 15, 2012

(30) Foreign Application Priority Data

Dec. 3, 2009    (JP) .................... 2009-275315

(51) Int. Cl.
*B23C 3/04* (2006.01)
*F16D 3/223* (2011.01)
(Continued)

(52) U.S. Cl.
CPC ............ *F16D 3/223* (2013.01); *B23C 3/04* (2013.01); *F16C 33/7826* (2013.01);
(Continued)

(58) Field of Classification Search
CPC .............. B23K 1/0012; A61F 2/064; A61B 2017/1135; H02K 1/14; G06K 7/10702;
(Continued)

(56) References Cited

U.S. PATENT DOCUMENTS 2,746,429 A * 5/1956 Vann .................. F16J 15/00
123/195 C
2,866,300 A * 12/1958 Grum-Schwensen .... B24B 9/00
451/200

(Continued)

FOREIGN PATENT DOCUMENTS

| CN | 1112656 | 11/1995 |
|---|---|---|
| CN | 101090802 | 12/2007 |

(Continued)

OTHER PUBLICATIONS

International Search Report dated Feb. 1, 2011 in International (PCT) Application No. PCT/JP2010/070691.

(Continued)

*Primary Examiner* — Jacob Cigna
(74) *Attorney, Agent, or Firm* — Wenderoth, Lind & Ponack, L.L.P.

(57) ABSTRACT

Provided is a method of machining a sealing surface, the method being capable of finishing a sealing surface at low cost and in a short period of time, eliminating lead marks, and forming the sealing surface highly accurately. The method of machining a sealing surface comprises finishing a sealing surface (M), which is to be machined, by cutting the sealing surface (M) using a rotating cutting tool (81) while rotating a workpiece having the sealing surface (M) about an axis thereof. The cutting of the sealing surface (M) using the rotating cutting tool (81) comprises hardened steel cutting which generates no lead marks.

7 Claims, 5 Drawing Sheets

(51) Int. Cl.
*F16D 3/227* (2006.01)
*F16C 33/78* (2006.01)
*F16C 33/58* (2006.01)

(52) U.S. Cl.
CPC .......... *F16D 3/227* (2013.01); *B23C 2215/08* (2013.01); *B23C 2222/84* (2013.01); *B23C 2228/24* (2013.01); *F16C 33/583* (2013.01); *F16D 2003/22326* (2013.01); *F16D 2250/00* (2013.01); *F16D 2300/08* (2013.01); *F16D 2300/10* (2013.01); *Y10T 409/303752* (2015.01)

(58) Field of Classification Search
CPC G06K 1/10732; G06K 7/10831; F16D 3/223; F16D 3/227; F16D 2250/00; F16D 2300/08; F16D 2300/10; F16D 2003/22326; F16C 33/7826; F16C 33/583; B23C 3/04; B23C 2228/24; B23C 2215/08; B23C 2222/84; Y10T 409/303752
See application file for complete search history.

(56) References Cited

U.S. PATENT DOCUMENTS

| | | | | |
|---|---|---|---|---|
| 2,969,779 | A * | 1/1961 | Hauser | F16C 33/74 123/195 C |
| 3,555,745 | A * | 1/1971 | Ueda | B24B 5/045 451/49 |
| 3,668,814 | A * | 6/1972 | Freerks | B24B 21/00 451/306 |
| 4,535,570 | A * | 8/1985 | Ochiai | G05B 19/4166 451/11 |
| 4,626,150 | A * | 12/1986 | Dapiran et al. | 409/199 |
| 4,707,946 | A * | 11/1987 | Hirohata | B24B 5/37 451/283 |
| 5,359,814 | A * | 11/1994 | Baltazar | B24B 19/02 451/11 |
| 5,618,234 | A | 4/1997 | Carden | |
| 6,063,148 | A * | 5/2000 | Fischbacher | 51/293 |
| 6,132,316 | A | 10/2000 | Statham | |
| 6,470,775 | B1 * | 10/2002 | Kohlhase | B23B 5/18 29/6.01 |
| 7,762,894 | B2 * | 7/2010 | Momiyama et al. | 464/11 |
| 2005/0185871 | A1 * | 8/2005 | Morita et al. | 384/544 |
| 2006/0261667 | A1 * | 11/2006 | Sensui | B24B 7/16 301/105.1 |
| 2007/0298890 | A1 * | 12/2007 | Momiyama et al. | 464/147 |
| 2009/0116921 | A1 * | 5/2009 | Naumann | B21H 7/185 409/131 |
| 2010/0088874 | A1 * | 4/2010 | Stanik | B23B 29/24 29/428 |
| 2010/0216375 | A1 * | 8/2010 | Kaito | 451/41 |
| 2011/0136409 | A1 * | 6/2011 | Tanio et al. | 451/28 |

FOREIGN PATENT DOCUMENTS

| | | |
|---|---|---|
| CN | 201195476 | 2/2009 |
| JP | 177608 | 12/1949 |
| JP | 58-149102 | 9/1983 |
| JP | 09-096318 | 4/1997 |
| JP | 11-010426 | 1/1999 |
| JP | 2003-117716 | 4/2003 |
| JP | 2004-338005 | 12/2004 |
| JP | 2005-233374 | 9/2005 |
| JP | 2005-335514 | 12/2005 |
| JP | 2007-15091 | 1/2007 |
| JP | 2010-234511 | 10/2010 |
| WO | WO 2007007485 A1 * | 1/2007 |

OTHER PUBLICATIONS

Supplementary European Search Report dated May 2, 2013 in corresponding European Patent Application No. 10834494.6.
International Preliminary Report on Patentability and Written Opinion of the International Searching Authority dated Jul. 19, 2012 in International (PCT) Application No. PCT/JP2010/070691.
Chinese Office Action dated Nov. 26, 2013 in corresponding Chinese Patent Application No. 201080054166.1 with English translation.

* cited by examiner

METHOD OF MACHINING SEALING SURFACE

TECHNICAL FIELD

The present invention relates to a method of machining a sealing surface formed in an outer joint member of a constant velocity universal joint or the like for use, for example, in a power transmission system for automobiles and various industrial machines.

BACKGROUND ART

An outer joint member of a constant velocity universal joint comprises, for example, a mouth section, and a stem section protruded from a bottom wall of the mouth section. Further, examples of the stem sections include a stem section provided with an oil seal fit portion. As described in Patent Literature 1 and the like, there is proposed a method of finishing an outer surface of this oil seal fit portion (that is, sealing surface) using an elastic grindstone.

That is, Patent Literature 1 describes the method of first performing turning using the turning tool, and then polishing the turned surface using the elastic grindstone for removing the turning lead marks.

CITATION LIST

Patent Literature 1: JP 2007-15091 A

SUMMARY OF INVENTION

Technical Problems

However, the above-mentioned method described in Patent Literature 1 needs to carry out a turning process and a polishing process. Accordingly, a working time period is increased as a whole, and an apparatus is increased in size, which leads to a cost increase. In addition, machining using a grindstone generates dust, sludge, or the like, and hence a working environment is deteriorated.

Therefore, in view of the above-mentioned circumstances, the present invention provides a method of machining a sealing surface, the method being capable of finishing a sealing surface at low cost and in a short period of time, eliminating lead marks, and forming the sealing surface highly accurately.

Solution to Problems

A method of machining a sealing surface according to the present invention comprises finishing a sealing surface, which is to be machined, by cutting the sealing surface using a rotating cutting tool while rotating a workpiece having the sealing surface about an axis thereof. Here, the sealing surface refers to a surface on which a sealing member is fitted, a surface with which the sealing member is held in contact, or the like, that is, a surface to be sealed. Note that, a surface roughness of the sealing surface finished by cutting is comparable to a surface roughness of a sealing surface of this type conventionally finished by grinding.

According to the method of machining a sealing surface of the present invention, without performing machining using a grindstone, the sealing surface can be finished.

The cutting of the sealing surface using the rotating cutting tool comprises hardened steel cutting which generates no lead marks. The rotating cutting tool comprises a columnar milling tool, and comprises a cutting portion formed of an axial end surface portion. The cutting is performed using the above-mentioned axial end surface portion of the milling tool, and thus the sealing surface having no lead marks can be formed. The hardened steel cutting merely means cutting. Cutting is normally carried out on a raw material. Accordingly, in order to clearly describe that the cutting of the present invention is cutting performed after heat treatment (after quenching), the cutting of the present invention is referred to as hardened steel cutting.

The workpiece may comprise an outer joint member of a constant velocity universal joint, and the sealing surface may comprise an outer surface of a stem section of the outer joint member, an outer surface of a stem section of the outer joint member, the outer surface having an oil groove formed therein, or an oil sealing surface of the outer joint member. Further, the workpiece may comprise a shaft, and the sealing surface may comprise a boot mounting surface for a constant velocity universal joint.

The workpiece may comprise a bearing apparatus comprising: an outer member having an inner periphery in which double-row outer raceway surfaces are formed; an inner member having an outer peripheral surface in which inner raceway surfaces corresponding to the double-row outer raceway surfaces are formed; rolling elements arranged between the double-row outer raceway surfaces and the inner raceway surfaces so as to freely roll; and a retainer for retaining the rolling elements, and the sealing surface may comprise a sealing surface provided in the outer member.

The workpiece may comprise a wheel bearing apparatus provided with a hub wheel which has a flange to be fixed to a wheel, and the sealing surface may comprise a sealing surface provided in the hub wheel.

Advantageous Effects of Invention

According to the method of machining a sealing surface of the present invention, without performing machining using a grindstone, the sealing surface can be finished, and hence it is possible to shorten a machining (working) time period as a whole, and to simplify equipment. In addition, the machining using a grindstone is not performed, and hence dust, sludge, or the like is not generated.

When using the columnar milling tool comprising the cutting portion formed of the axial end surface portion, it is possible to stably form the sealing surface having no lead marks. Further, the hardened steel cutting is performed as dry cutting, and hence a grinding coolant is not needed. Accordingly, the hardened steel cutting is eco-friendly, and in addition, has an advantage of being capable of finishing a workpiece to a precise dimension.

The sealing surfaces in various regions of the outer joint member of the constant velocity universal joint can be machined to have no marks, and hence exert a high-precision sealing function when a sealing device (sealing member) is fitted on those sealing surfaces. Further, when the sealing surface is the boot mounting surface of the shaft, airtightness of the boot can be increased.

When the workpiece is the bearing apparatus and the above-mentioned sealing surface is the sealing surface provided in the outer member of the bearing apparatus, airtightness of an inside of the bearing apparatus can be increased. When the workpiece is the wheel bearing apparatus provided with the hub wheel which has the flange to be fixed to a wheel, and when the sealing surface is the sealing surface provided in the hub wheel, airtightness of an inside of the wheel bearing apparatus can be increased.

DESCRIPTION OF EMBODIMENT

Hereinafter, an embodiment of the present invention is described with reference to FIGS. 1 to 6.

Figure 5:
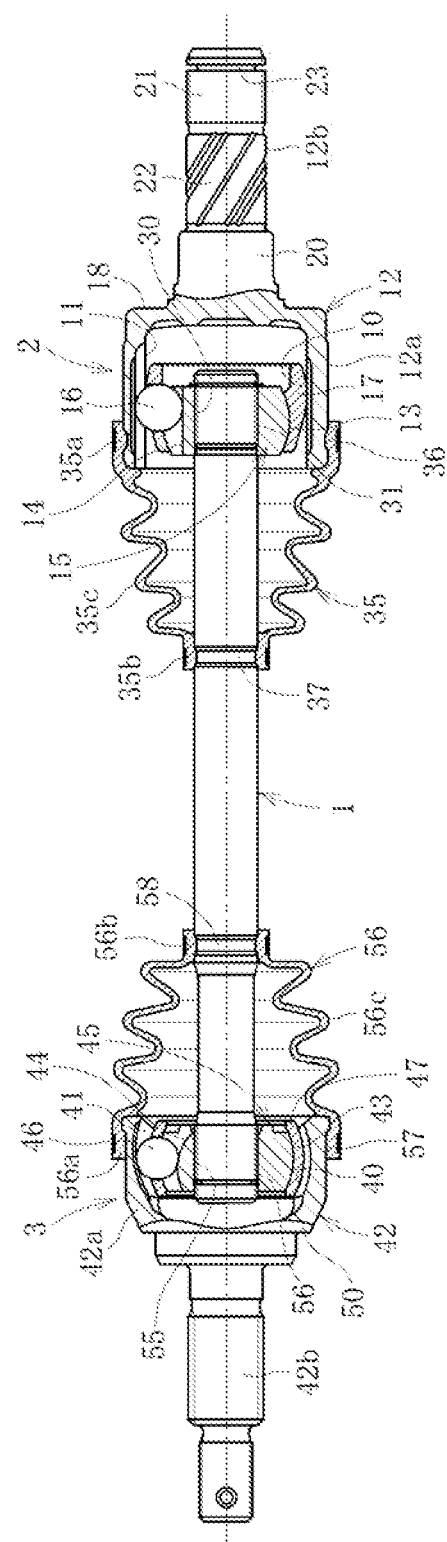
FIG. 5 A side view illustrating a drive shaft to be machined by the method of machining a sealing surface according to the present invention.

FIG. 5 illustrates a drive shaft using constant velocity universal joints machined by a method of machining a sealing surface according to the present invention. The drive shaft comprises an intermediate shaft 1, and constant velocity universal joints 2, 3 coupled to both ends of the intermediate shaft 1, respectively. One constant velocity universal joint 2 is a plunging type constant velocity universal joint, and the other constant velocity universal joint 3 is a fixed type constant velocity universal joint.

The constant velocity universal joint 2 comprises: an outer joint member 12 having a cylindrical inner peripheral surface in which track grooves 11 extending axially are formed equiangularly; an inner joint member 15 having a spherical outer peripheral surface 13 in which track grooves 14 extending axially are formed equiangularly; balls 16 interposed in pairs of the track grooves 11 of the outer joint member 12 and the track grooves 14 of the inner joint member 15; and a cage 17 in which pockets for receiving the balls are formed circumferentially at predetermined intervals.

Figure 1:
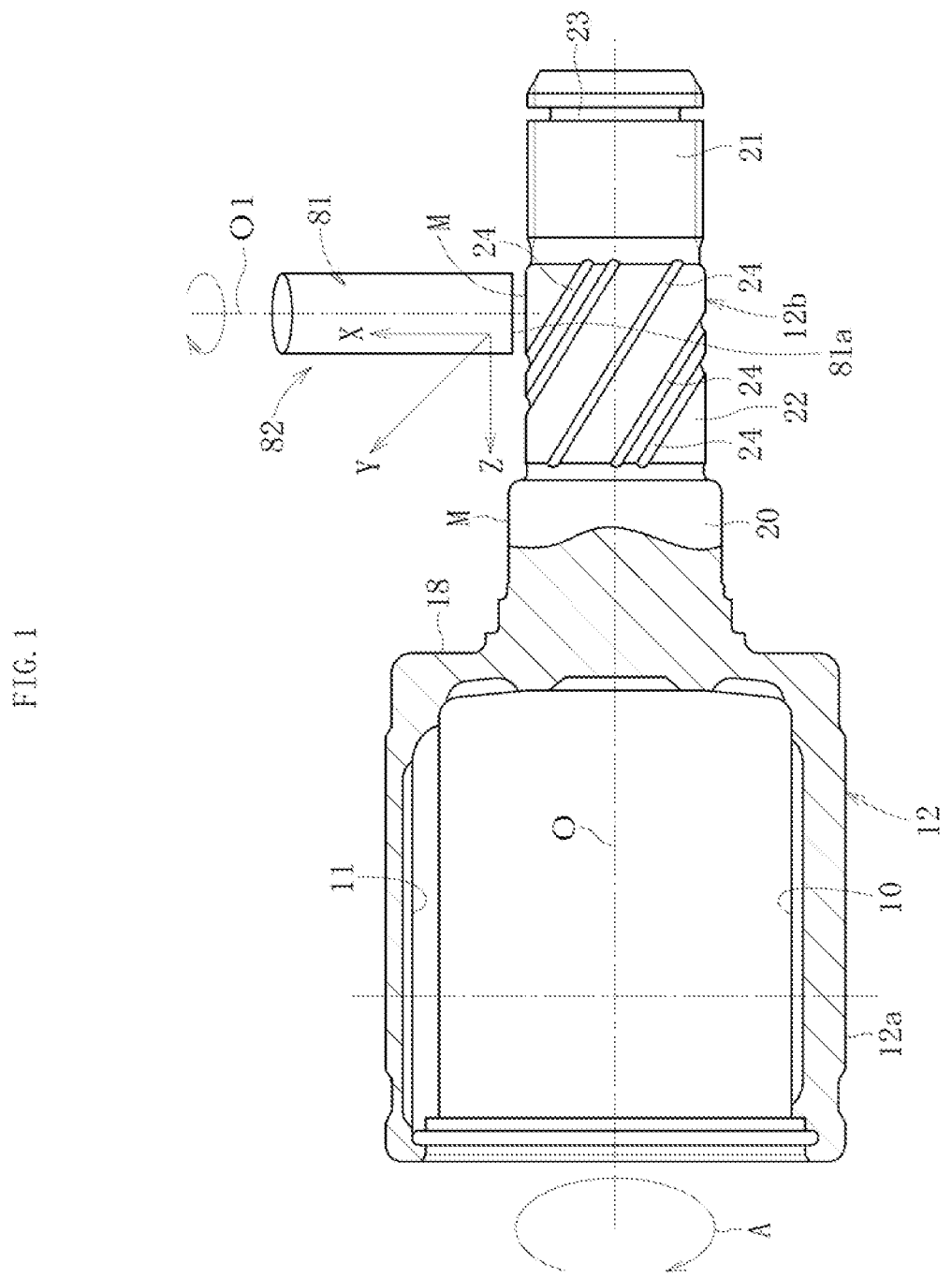
FIG. 1 A side and partially cross-sectional view illustrating an outer joint member of a constant velocity universal joint to be machined by a method of machining a sealing surface according to the present invention.

As illustrated in FIG. 1, the outer joint member 12 comprises a mouth section 12a in which the track grooves 11 are formed, and a stem section 12b protruded from a bottom wall 18 of the mouth section 12a. The stem section 12b comprises: a boss portion 20 having a large diameter and being situated on the bottom wall 18 side; a spline shaft portion 21 situated on a tip side; and an intermediate portion 22 situated between the spline shaft portion 21 and the boss portion 20. In the spline shaft portion 21, there is formed a peripheral groove 23 in which a snap ring for preventing slipping-off is fitted. Further, oil grooves 24 are formed in the intermediate portion 22. Note that, the oil grooves 24 are inclined at a predetermined angle with respect to an axial direction of the outer joint member 12.

As illustrated in FIG. 5, in an inner surface of a hole portion of the inner joint member 15 of the constant velocity universal joint 2, a female spline 30 is formed, and one end portion of the intermediate shaft 1 is fitted into the hole portion. In this case, in an outer surface at the one end portion of the intermediate shaft 1, a male spline 31 is formed, and the male spline 31 of the shaft 1 and the female spline 30 of the inner joint member 15 are spline-fitted to each other.

Further, an opening portion of the outer joint member 12 is sealed with a boot 35. The boot 35 comprises a large diameter portion 35a, a small diameter portion 35b, and a bellows portion 35c coupling the large diameter portion 35a and the small diameter portion 35b to each other. The large diameter portion 35a is outwardly fitted to a boot mounting portion 36 of the mouth section 12a on the opening portion side of the outer surface thereof, and in this state, fastened by a boot band. Thus, the large diameter portion 35a is mounted to the boot mounting portion 36 of the mouth section 12a. The small diameter portion 35b is outwardly fitted to a boot mounting portion 37 of the shaft 1, and in this state, fastened by a boot band. Thus, the small diameter portion 35b is mounted to the boot mounting portion 37 of the shaft 1.

The constant velocity universal joint 3 comprises: an outer joint member 42 having an inner spherical surface 40 in which a plurality of track grooves 41 are formed equiangularly along an axial direction; an inner joint member 45 having an outer spherical surface 43 in which a plurality of track grooves 44 paired with the track grooves 41 of the outer joint member 42 are formed equiangularly along the axial direction; a plurality of balls 46 interposed between the track grooves 41 of the outer joint member 42 and the track grooves 44 of the inner joint member 45, for transmitting torque; and a cage 47 interposed between the inner spherical surface 40 of the outer joint member 42 and the outer spherical surface 43 of the inner joint member 45, for retaining the balls 46.

Figure 4:
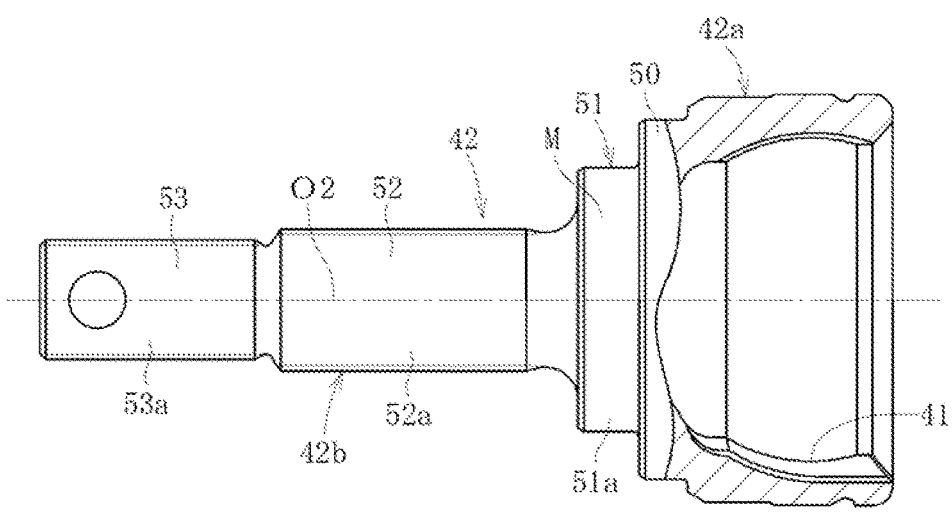
FIG. 4 A side and partially cross-sectional view illustrating an outer joint member of another constant velocity universal joint to be machined by the method of machining a sealing surface according to the present invention.

As illustrated in FIG. 4, the outer joint member 42 comprises a mouth section 42a in which the track grooves 41 are formed, and a stem section 42b protruded from a bottom wall 50 of the mouth section 42a through the intermediation of an oil seal fit portion 51. An outer periphery of the oil seal fit portion 51 is formed into a cylindrical surface 51a, and the cylindrical surface 51a serves as a sealing surface M which is described later. Further, the stem section 42b comprises: a body portion 52 having an outer surface in which a male spline 52a is formed; and a tip portion 53 having an outer surface in which an external thread portion 53a is formed.

In an inner surface of a hole portion of the inner joint member 45 of the constant velocity universal joint 3, a female spline 55 is formed, and the other end portion of the intermediate shaft 1 is fitted into the hole portion. In this case, in an outer surface at the other end portion of the intermediate shaft 1, a male spline 56 is formed, and the male spline 56 of the shaft 1 and the female spline 55 of the inner joint member 45 are spline-fitted to each other.

Further, an opening portion of the outer joint member 42 is sealed with a boot 56. The boot 56 comprises a large diameter portion 56a, a small diameter portion 56b, and a bellows portion 56c coupling the large diameter portion 56a and the small diameter portion 56b to each other. The large diameter portion 56a is outwardly fitted to a boot mounting portion 57 of the mouth section 42a on the opening portion side of the outer surface thereof, and in this state, fastened by a boot band. Thus, the large diameter portion 56a is mounted to the boot mounting portion 57 of the mouth section 42a. The small diameter portion 56b is outwardly fitted to a boot mounting portion 58 of the shaft 1, and in this state, fastened by a boot band. Thus, the small diameter portion 56*b* is mounted to the boot mounting portion 58 of the shaft 1.

Figure 6:
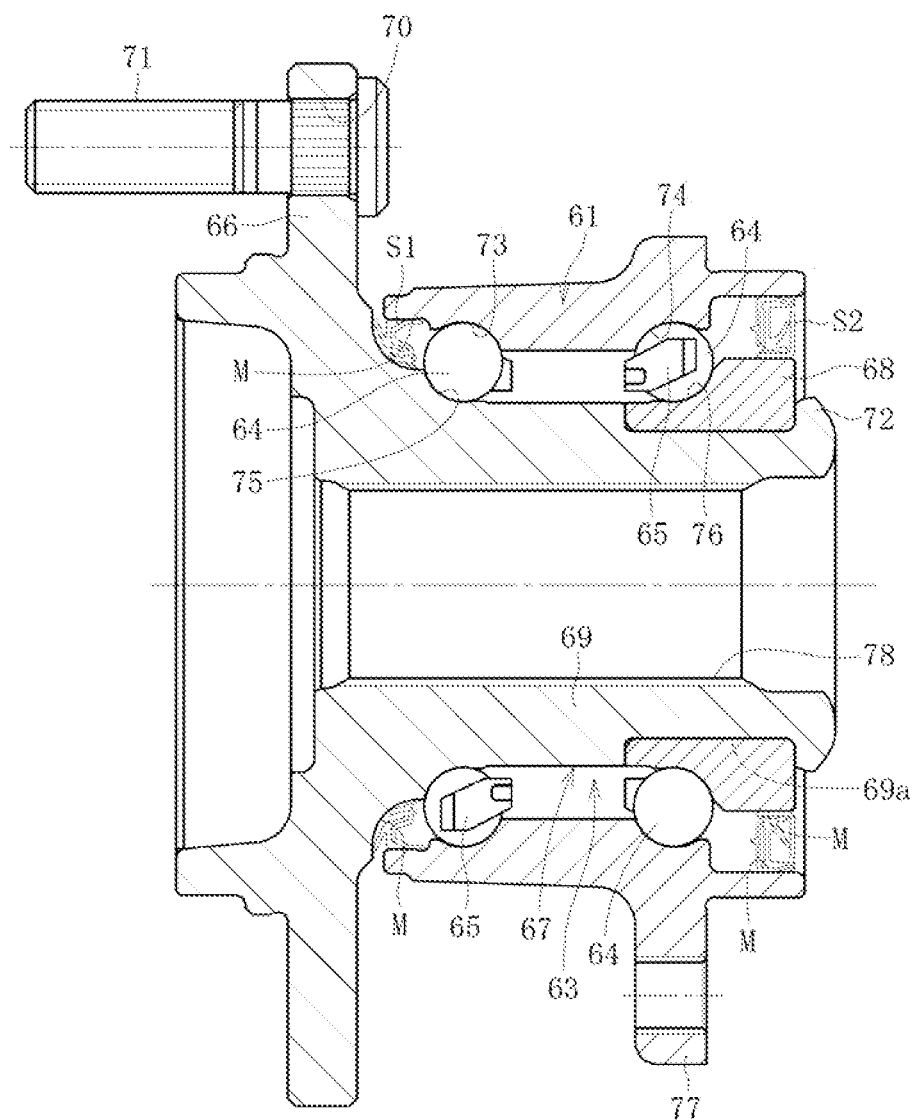
FIG. 6 A cross-sectional view illustrating a wheel bearing apparatus to be machined by the method of machining a sealing surface according to the present invention.

Next, FIG. 6 illustrates a wheel bearing apparatus subjected to the method of machining a sealing surface according to the present invention. The wheel bearing apparatus comprises: an outer member 61 having an inner periphery in which double-row outer raceway surfaces 73, 74 are formed; an inner member 63 having an outer peripheral surface in which inner raceway surfaces 75, 76 corresponding to the double-row outer raceway surfaces 73, 74 are formed; rolling elements 64 arranged between the outer raceway surfaces 73, 74 and the inner raceway surfaces 75, 76 so as to freely roll; and a retainer 65 for retaining the rolling elements 64.

The inner member 63 comprises a hub wheel 67 having a flange 66 to be fixed to a wheel, and an inner race 68 mounted to the hub wheel 67. That is, the hub wheel 67 comprises a cylindrical portion 69, and the above-mentioned flange 66 provided at an end portion of the cylindrical portion 69 on an outboard side. A bolt insertion hole 70 is provided in the flange 66 of the hub wheel 67, and a wheel and a brake rotor are fixed to the flange 66 by a hub bolt 71 embedded in the bolt insertion hole 70. A small diameter portion 69*a* is formed at an end portion of the cylindrical portion 69 on an inboard side, and the inner race 68 is fitted on the small diameter portion 69*a*. Further, an end portion of the small diameter portion 69*a* is caulked radially outward, and a caulked portion 72 thus formed is abutted on an end surface of the inner race 68. As a result, the inner race 68 is fixed on the hub wheel 67, and simultaneously, preload is applied. Herein, the outboard side refers to an outer side of a vehicle in a state in which the wheel bearing apparatus is fixed to the vehicle, and the inboard side refers to an inner side of the vehicle in a state in which the wheel bearing apparatus is fixed to the vehicle.

A flange 77 to be fixed to a vehicle body is protruded on the outer surface of the outer member 61. Further, the outer raceway surface 73 of the outer member 61 on the outboard side is opposed to the inner raceway surface 75 provided in the cylindrical portion 69 of the hub wheel 67, and the rolling elements 64 are interposed between the outer raceway surface 73 and the inner raceway surface 75. Further, the outer raceway surface 74 of the outer member 61 on the inboard side is opposed to the inner raceway surface 76 formed on the outer surface of the inner race 68, and the rolling elements 64 are interposed between the outer raceway surface 74 and the inner raceway surface 76. Note that, a male spline 78 is formed in the inner surface of the cylindrical portion 69 of the hub wheel 67.

Both axial end portions of the outer member 61 are sealed with sealing members S1, S2, respectively. That is, in the hub wheel 67, a part between the flange 66 and the inner raceway surface 75 serves as the sealing surface M, and the inboard side of the outer surface of the inner race 68 serves as the sealing surface M. Further, both axial end portions of the inner surface of the outer member 61 serve as the sealing surfaces M, M.

In the above-mentioned outer joint member 12 of the constant velocity universal joint 2 illustrated in FIG. 1, the boss portion 20 and the intermediate portion 22 constitute the sealing surfaces M. Accordingly, the outer joint member 12 having those sealing surfaces M is treated as a workpiece according to the present invention, and the sealing surfaces M are to be machined by the machining method according to the present invention.

Figure 2:
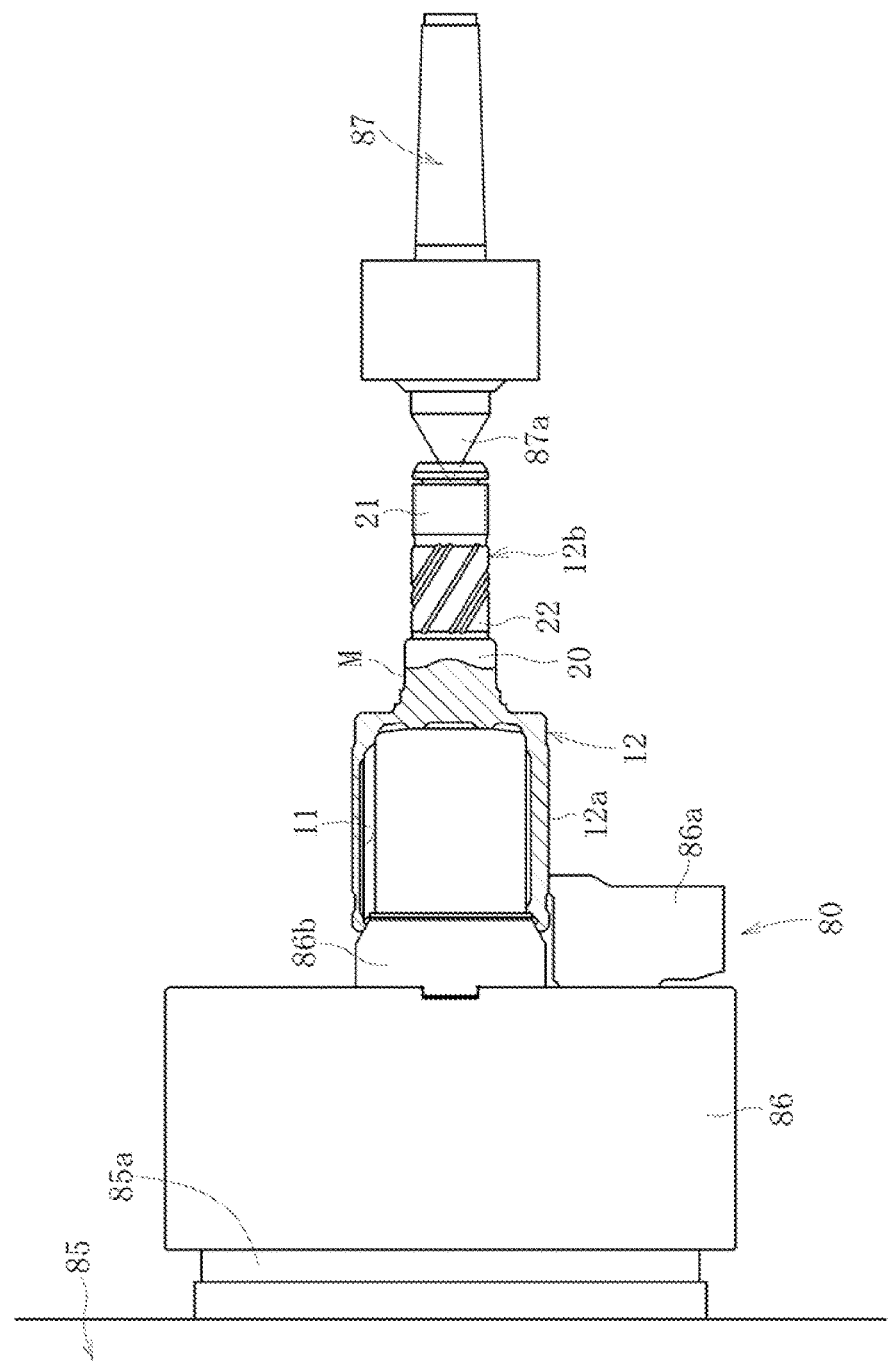
FIG. 2 A simplified side view illustrating a chucking device for chucking the outer joint member of the constant velocity universal joint.
Figure 3:
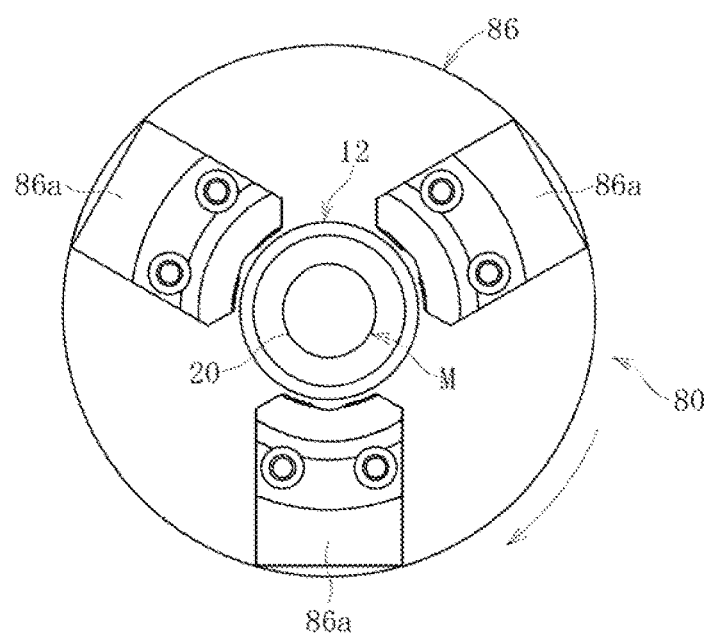
FIG. 3 A simplified front view illustrating the chucking device.

In this case, the outer joint member 12 is chucked by, for example, a chucking device 80 illustrated in FIGS. 2 and 3, and the sealing surfaces M are cut by a cutting tool 82 illustrated in FIG. 1. The chucking device 80 comprises a headstock 85 of a lathe, a three-jaw chuck 86 fixed to a spindle 85*a* of the headstock 85, and a tailstock 87 arranged opposed to the headstock 85.

The three-jaw chuck 86 comprises a shaft member 86*b* which is fitted to the opening portion of the mouth section 12*a* of the outer joint member 12, and chuck jaws 86*a* which are disposed at a pitch of 120° along a peripheral direction as illustrated in FIG. 3. Each of the chuck jaws 86*a* can be adjusted in its radial position. Each of the chuck jaws 86*a* is moved in a radially inward direction, and thus can hold the mouth section 12*a* of the outer joint member 12 from a radially outer side thereof. Further, a conical center 87*a* is provided at a tip of the tailstock 87, and the center 87*a* is abutted against a center portion of the end surface of the stem section of the outer joint member 12.

The chucking device can support the outer joint member 12 in the following manner. To the shaft member 86*b* of the three-jaw chuck 86, the opening portion of the mouth section 12*a* of the outer joint member 12 is fitted. Further, the chuck jaws 86*a* of the three-jaw chuck 86 hold the mouth section 12*a* of the outer joint member 12, and the center 87*a* of the tailstock 87 is abutted against the center portion of the end surface of the stem section of the outer joint member 12. In this manner, the outer joint member 12 is supported in a centered state. Further, in this state, through rotating the spindle 85*a*, the outer joint member 12 is rotated about an axis O thereof in an arrow "A" direction (see FIG. 1).

Further, the cutting tool 82 is formed of a milling tool 81 shaped into a column as illustrated in FIG. 1, and is rotated about an axis O1 thereof by driving means (not shown). In addition, by moving means (not shown), the milling tool 81 can be reciprocated in a direction orthogonal to the axis O direction of the outer joint member 12 (reciprocated in an X-axis direction of FIG. 1), and can be reciprocated in a direction parallel to the axis O direction (reciprocated in a Z-axis direction of FIG. 1). Accordingly, through combination of the reciprocation in the direction orthogonal to the axis O direction and the reciprocation in the direction parallel to the axis O direction, the milling tool 81 can be reciprocated in a direction inclined at a predetermined angle with respect to the axis O direction (reciprocated in a Y-axis direction of FIG. 1).

The driving means for driving the cutting tool 82 can comprise a drive motor, and a transmission mechanism, such as a gear and a belt, for transmitting a rotational driving force of the motor to the milling tool 81. Further, the moving means can comprise a cylinder mechanism, and a ball-and-nut mechanism.

Next, there is described a method of machining a sealing surface using the milling tool 81 illustrated in FIG. 1 and the chucking device 80 illustrated in FIGS. 1 and 2. First, as illustrated in FIG. 2, the outer joint member 12 is chucked. In this state, the spindle 85*a* is rotated in an arrow direction of FIG. 3, and thus the outer joint member 12 is rotated about the axis O thereof in the arrow "A" direction.

In a case of cutting the sealing surface M which is the outer surface of the intermediate portion 22 in which the oil grooves 24 are formed, the cutting may be performed in the following manner. While rotating the milling tool 81 about the axis O1 thereof, a tip surface (axial end surface portion 81*a*) of the milling tool 81 is brought close to and pressed against the outer surface of the intermediate portion 22 serving as the sealing surface M, and then the milling tool 81 is reciprocated in the Z-axis direction of FIG. 1. In a case of cutting the sealing surface M which is the outer surface of the boss portion 20, the cutting may be performed in the following manner. While rotating the milling tool 81 about the axis O1 thereof, the tip surface (axial end surface portion 81a) of the milling tool 81 is brought close to and pressed against the outer surface of the intermediate portion 22 serving as the sealing surface M, and then the milling tool 81 is reciprocated in the Z-axis direction of FIG. 1. As described above, a cutting portion of the milling tool 81 is formed of the axial end surface portion 81a. Note that, a surface roughness of the sealing surface finished by cutting is comparable to a surface roughness of a sealing surface of this type conventionally finished by grinding.

Further, in a case of cutting the sealing surface M (outer surface of the oil seal fit portion) of the outer joint member 42 of the constant velocity universal joint 3, as in the case of the outer joint member 12 of the constant velocity universal joint 2, the outer joint member 42 is supported in a centered state by the chucking device 80. Then, the cutting may be performed in the following manner. The outer joint member 42 is rotated about an axis O2 thereof through rotating the spindle 85a. Further, while rotating the milling tool 81 about the axis O1 thereof, the tip surface of the milling tool 81 is brought close to and pressed against the outer surface of the oil seal fit portion serving as the sealing surface M, and then the milling tool 81 is reciprocated in the axis O2 direction.

The shaft 1 also has the sealing surfaces M, that is, the outer surface of the boot mounting portion 37 and the outer surface of the boot mounting portion 58. Accordingly, the shaft 1 is treated as the workpiece according to the present invention. Also in this case, while the shaft 1 having the sealing surfaces M to be machined is rotated about the axis thereof, the sealing surfaces M are finished by cutting using the rotating cutting tool 82.

In this case, by a chucking device different from the above-mentioned chucking device 80, the shaft 1 is supported in a centered state. Cutting of the shaft 1 may be performed in the following manner. The shaft 1 is rotated about the axis thereof in this centered state. Then, the tip surface of the milling tool 81 is brought close to and pressed against the outer surface of the boot mounting portion serving as the sealing surface M, and then the milling tool 81 is reciprocated in the axial direction of the shaft.

Note that, it is only necessary that the chucking device for supporting the shaft 1 can rotate the shaft 1 in the centered state about the axis thereof, and hence various existing chucking devices can be used.

Further, the above-mentioned cutting is performed similarly also in a case of machining the sealing surfaces M of the outer member 61 or the sealing surface M of the hub wheel 67 illustrated in FIG. 6. That is, in a case of machining the sealing surfaces M of the outer member 61, the machining may be performed in the following manner. The outer member 61 is rotated about the axis thereof. Then, the tip surface of the milling tool 81 is brought close to and pressed against the inner surface at each axial end portion of the outer member 61 serving as the sealing surface M, and then the milling tool 81 is reciprocated in the axial direction of the outer member 61. Further, in a case of machining the sealing surface M of the hub wheel 67, the machining may be performed in the following manner. The hub wheel 67 is rotated about the axis thereof. Then, the tip surface of the milling tool 81 is brought close to and pressed against the outer surface of the hub wheel 67 serving as the sealing surface M, and then the milling tool 81 is reciprocated in accordance with a shape of the sealing surface.

According to the method of machining a sealing surface of the present invention, while rotating the workpiece having the sealing surface M to be machined about the axis thereof, the above-mentioned sealing surface M is finished by cutting using the rotating cutting tool 82. Accordingly, it is possible to shorten a machining (working) time period as a whole, and to simplify equipment. In addition, machining using a grindstone is not performed, and hence dust, sludge, or the like is not generated. Note that, a surface roughness of the sealing surface finished by cutting is comparable to a surface roughness of a sealing surface of this type conventionally finished by grinding.

By the way, each sealing surface M is subjected to heating treatment such as induction hardening. Accordingly, cutting of the sealing surface M using the cutting tool 82 comprises hardened steel cutting which generates no lead marks, and hence it is possible to form a high-quality sealing surface M. In particular, when using the columnar milling tool 81 comprising the cutting portion formed of the axial end surface portion 81a, it is possible to stably form the sealing surface M having no lead marks. Further, the hardened steel cutting is performed as dry cutting, and hence a grinding coolant is not needed. Accordingly, the hardened steel cutting is eco-friendly, and in addition, has an advantage of being capable of finishing a workpiece to a precise dimension.

As described above, according to the method of machining the sealing surface M of the present invention, the sealing surfaces M in various regions of the outer joint member 12 of the constant velocity universal joint can be machined to have no marks, and hence exert a high-precision sealing function when a sealing device (sealing member) is fitted on those sealing surfaces M. Further, when the sealing surface M is the boot mounting portion of the shaft 1, airtightness of the boot can be increased.

When the workpiece is the bearing apparatus and the above-mentioned sealing surface is the sealing surface M provided in the outer member 61 of the bearing apparatus, airtightness of an inside of the bearing apparatus can be increased. When the workpiece is the wheel bearing apparatus provided with the hub wheel 67 which has the flange 66 to be fixed to a wheel, and when the sealing surface M is the sealing surface M provided in the hub wheel 67, airtightness of an inside of the wheel bearing apparatus can be increased.

As in the embodiment of the present invention, when the milling tool 81 can be reciprocated in the X-axis direction of FIG. 1, reciprocated in the Z-axis direction of FIG. 1, and reciprocated in the Y-axis direction of FIG. 1, the sealing surfaces M having various shapes can be machined. The reciprocation in the direction inclined with respect to the axial direction of the workpiece is not limited to reciprocation in a direction inclined at 45 degrees with respect to the axial direction of the workpiece.

The embodiment of the present invention is described above, but the present invention is not limited to the above-mentioned embodiment and various modifications can be made thereto. For example, depending on a size, a shape, a material, and the like of the workpiece, various changes can be made to rotational speed of the workpiece (outer joint member or the like), rotational speed of the milling tool, moving speed of the milling tool, a pressing force applied on the workpiece by the milling tool, and the like at the time of machining the sealing surface M.

As the wheel bearing apparatus, the above-mentioned embodiment exemplifies a third-generation type in which one of inner raceway surfaces of a double-row rolling bearing is integrally formed on an outer periphery of a hub wheel integrally having a flange to be fixed to a wheel. However, the present invention is also applicable to a first-generation type in which the double-row rolling bearing is used independently, a second-generation type in which an outer member integrally has a flange to be fixed to a vehicle body, and a fourth-generation wheel bearing apparatus in which a constant velocity universal joint is integrated with the hub wheel, and the other of the inner raceway surfaces of the double-row rolling bearing is integrally formed on an outer periphery of an outer joint member forming the constant velocity universal joint.

INDUSTRIAL APPLICABILITY

The sealing surface can be finished without performing the machining using a grindstone. The sealing surface comprises the oil seal fit portion in the outer joint member of the constant velocity universal joint, and the sealing surface on which the sealing member of the wheel bearing apparatus is fitted.

REFERENCE SIGNS LIST 1 shaft
12 outer joint member
12b stem section
24 oil groove
61 outer member
63 inner member
64 rolling element
65 retainer
66 flange
67 hub wheel
73 outer raceway surface
74 outer raceway surface
75 inner raceway surface
76 inner raceway surface
81 milling tool
82 cutting tool
81a axial end surface portion
M sealing surface

The invention claimed is:

1. A method of machining a sealing surface, the method comprising finishing a sealing surface formed into a cylindrical surface, which is to be machined, by cutting the sealing surface using a rotating cutting tool while rotating a workpiece having the sealing surface about an axis thereof,
   wherein the workpiece comprises an outer joint member of a constant velocity universal joint,
   wherein the sealing surface comprises a sealing surface of the outer joint member,
   wherein the sealing surface is adapted to have fitted thereon a sealing member for preventing oil leakage,
   wherein the rotating cutting tool excludes an elastic grindstone and a grindstone that uses a coolant, and comprises a columnar milling tool, and comprises a cutting portion formed of an axial end surface portion,
   wherein the cutting of the sealing surface using the rotating cutting tool comprises hardened steel cutting, which generates no lead marks, without using a coolant, and
   wherein the rotating cutting tool is disposed orthogonal to the axis of the sealing surface, and the rotating cutting tool is reciprocated in an axial direction of the sealing surface while rotating about an axis of the rotating cutting tool in the hardened steel cutting.

2. A method of machining a sealing surface according to claim 1,
   wherein the sealing surface of the outer joint member is an outer surface of a stem section of the outer joint member.

3. A method of machining a sealing surface according to claim 1,
   wherein the sealing surface of the outer joint member is an outer surface of a stem section of the outer joint member, the outer surface having an oil groove formed therein.

4. A method of machining a sealing surface according to claim 1,
   wherein the sealing surface of the outer joint member is an oil sealing surface of the outer joint member.

5. A method of machining a sealing surface according to claim 1,
   wherein the constant velocity universal joint is connected to a shaft, and
   wherein the sealing surface is a boot mounting surface for the constant velocity universal joint.

6. A method of machining a sealing surface according to claim 1,
   wherein the sealing surface is an outer circumferential surface, and
   wherein, during the cutting of the sealing surface, a central axis of the columnar milling tool is orthogonal to the axis of the sealing surface.

7. A method of machining a sealing surface according to claim 1,
   wherein, during the cutting of the sealing surface, the axis of the workpiece about which the workpiece is rotated is orthogonal to the axis of the rotating cutting tool about which the rotating cutting wheel is rotated.

* * * * *